Aug. 19, 1941.  H. E. LASCH  2,252,855
FASTENING MEANS FOR DETACHABLY SECURING HANDLES TO OPERATING SHAFTS
Filed Feb. 3, 1940  2 Sheets-Sheet 1
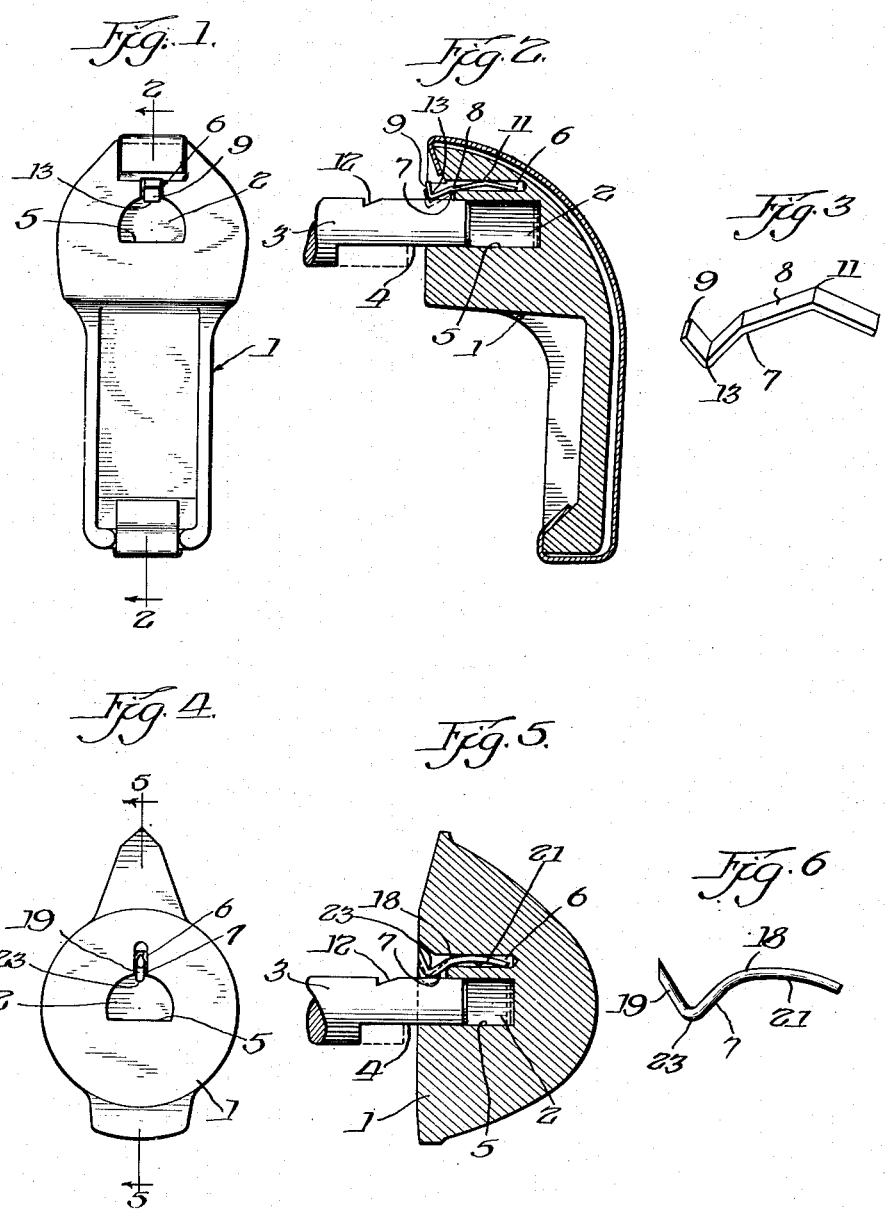
Inventor:
Harry E. Lasch
By Hice & Hietty Aug. 19, 1941.   H. E. LASCH   2,252,855
FASTENING MEANS FOR DETACHABLY SECURING HANDLES TO OPERATING SHAFTS
Filed Feb. 3, 1940   2 Sheets-Sheet 2
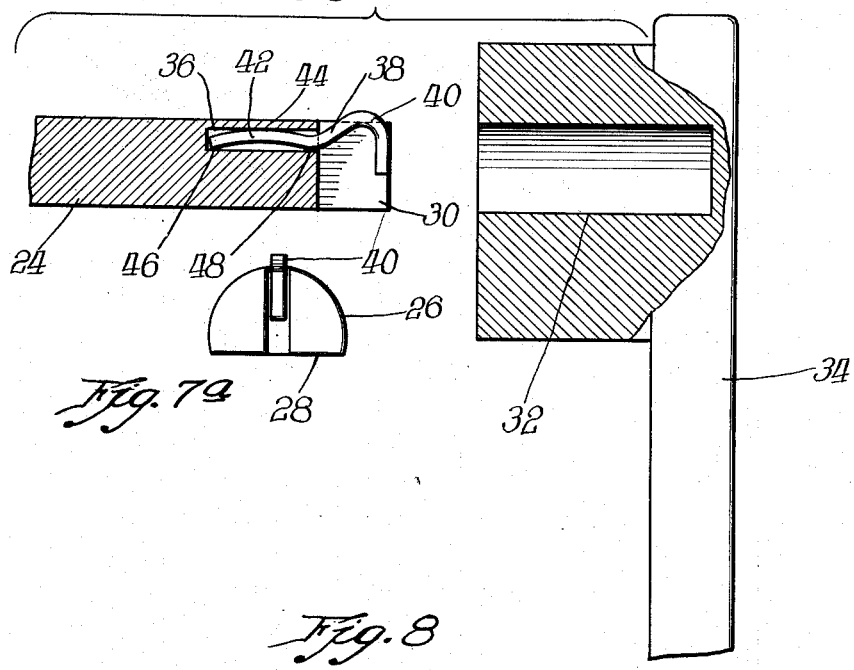
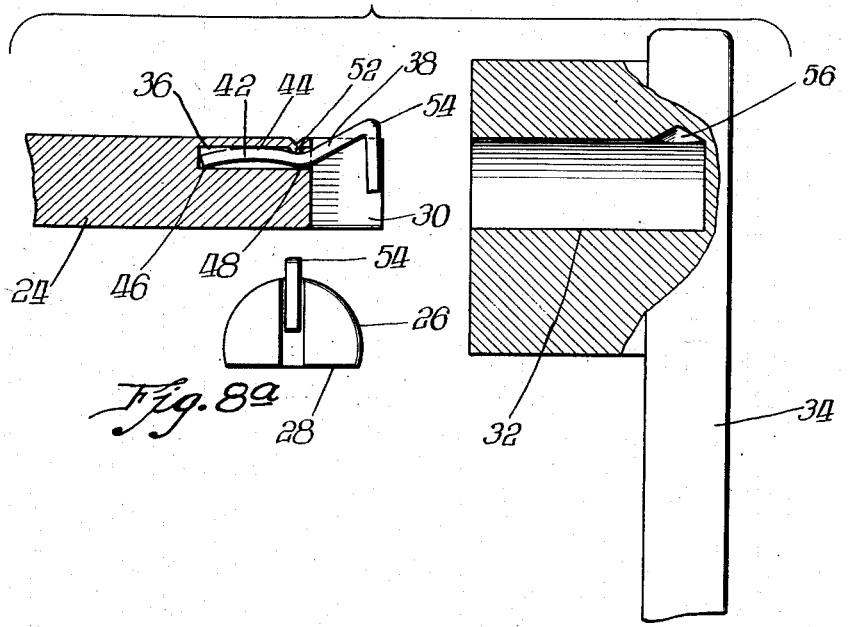
INVENTOR.
Harry E. Lasch
BY
Wilkinson, Huxley, Byron & Knight
ATTORNEY.

Patented Aug. 19, 1941

2,252,855

UNITED STATES PATENT OFFICE 2,252,855

FASTENING MEANS FOR DETACHABLY SECURING HANDLES TO OPERATING SHAFTS

Harry E. Lasch, Chicago, Ill.

Application February 3, 1940, Serial No. 317,209

8 Claims. (Cl. 292—353)

This invention relates to a new and improved means for detachably securing a handle to a shaft or stem of the type employed for manually actuating or adjusting various types of devices or instruments. The invention is herein illustrated as applied to the stem or handle of a gas range valve but it will be apparent that the invention may be applied with equal advantage to all similar stems or handles such as those used for radio parts, controls on automobiles and other similar appliances.

It is an object of this invention to provide an improved stem or shaft construction, preferably of non-round cross section, together with a handle therefor having a socket of corresponding shape adapted to fit on the stem or shaft so that the shaft may be readily turned by means of such handle. The shaft or the handle is also provided with attaching means which establishes a strong frictional engagement between the shaft and handle whereby the handle in use is maintained against accidental displacement while at the same time it is capable of being removed from the stem by a forced movement in an axial direction and of being applied to the stem of the shaft by an axial thrust in the opposite direction. This invention provides a very convenient and satisfactory means for mounting such operating handles particularly in cases where it is desirable to be able to quickly remove such handles to enable the removal of other parts of the apparatus to which the handle and stem construction is applied.

The present invention is designed to eliminate the difficulties inherent in the devices heretofore used, and to provide a frictional holding means for detachably securing a handle to an operating stem or shaft which will effectively hold the handle against accidental displacement and yet will permit the handle to be readily applied and removed by a forced axial movement.

Still another object of the present invention is to provide a novel connection between the handle and the shaft or stem comprising a spring element frictionally connected to one of these parts and projecting therefrom for frictional engagement with the other of the parts when the device is assembled for holding the same together.

More particularly, the invention embraces within its scope a novel construction for the said spring element which is formed with a laterally offset securing shank wherein the marginal portions of the said shank are spaced apart a substantially greater distance than the width of the slot in one of the parts receiving the same to frictionally secure said spring element in operative position for frictional engagement with the other part of the device.

Still another object of the present invention is to provide a novel arrangement for the various elements of the device as hereinabove set forth wherein the said part in which the spring element is mounted positively engages the spring element to hold the said spring element in place to prevent unauthorized or accidental displacement thereof without depending upon the compressed condition of the shank forming the securing means for said spring element.

Other objects, features, capabilities and advantages are comprehended by the invention, as will later appear and as are inherently possessed thereby.

The present application is a continuation-in-part of my copending application Serial No. 272,739, filed May 10, 1939.

Referring to the drawings:

Figure 1 is an end elevational view of a handle embodying the present invention;

Figure 2 is a sectional view of the same taken on the line 2—2 of Figure 1, also showing a portion of a shaft;

Figure 3 is a perspective view of the spring element used in the handle shown in Figures 1 and 2;

Figure 4 is an end elevational view of a knob embodying a slight modification of the invention;

Figure 5 is a sectional view taken on the line 5—5 of Figure 4, also showing a portion of a shaft;

Figure 6 is a side elevational view of the spring element used in the knob shown in Figures 4 and 5;

Figure 7 is an exploded view partly in elevation and partly in section of parts of a device of alternative construction made in accordance with the present invention;

Figure 7a is a view in end elevation of the part shown at the left in Figure 7 of the drawings;

Figure 8 is a further exploded view partly in elevation and partly in section of parts of a device of alternative construction made in accordance with the present invention; and Figure 8a is a view in end elevation of the part shown to the left in Figure 8 of the drawings.

Referring now more in detail to the drawings, an embodiment selected to illustrate the present invention is disclosed in Figures 1 to 3 inclusive as including a handle, generally designated as 1, which may be molded or otherwise formed from any suitable material having a shaft-receiving recess 2 of substantially the same size and shape as the end of the shaft 3. The shaft illustrated is of round cross section, a portion of the shaft adjacent the free end being cut away to form a flat face 4. The recess 2 is likewise provided with a flat side 5 which will seat upon the flat face 4 of the shaft when the handle is placed thereon, as shown in Figure 2. The handle 1 is provided with a second elongated relatively small recess 6 extending in the same general direction as the recess 2 and positioned adjacent the side of the recess 2 opposite the flat face 5 thereof. The two recesses communicate with one another adjacent the end of the handle as shown at 7. Positioned in the recess 6 is a spring element 8 shown in perspective in Figure 3. The free end of the element 8 is bent downwardly into the recess 2 where it will engage the shaft 3 when the latter is inserted into the recess as shown in Figure 2. The extreme end 9 of the element 8 is bent upwardly so that the end of the shaft 3 will urge the end of the element 8 upwardly where it will then ride upon the top of the shaft substantially as shown. As shown in Figure 3, the inner end of the element 8 is bent at 11 so that the member will frictionally engage the sides of the recess 6 when the former is inserted therein, thus firmly maintaining the two parts in assembled relation. If desired, the shaft 3 may be provided with a suitable notch 12 which is so positioned on the shaft that the shaft engaging portion 13 of the member 8 will fall into the notch 12 when the handle 1 has been pushed down sufficiently upon the end of the shaft. While it is not necessary to provide the notch 12 in all cases, it does provide further resistance against the removal of the knob as the member 8 will firmly engage the same, and therefore is desirable. The spring element 8, however, is sufficiently strong to prevent accidental removal of the handle from the shaft.

In the modification shown in Figures 4, 5 and 6, the body member is constructed substantially identical with that just described, the same reference characters denoting like elements, although the external appearance of the two constructions differs. The spring element 18, however, is constructed of round spring wire instead of the flat stock forming the member 8, the inner end of the member 18 being arched as shown at 21 instead of being provided with a sharp bend as is the member 8 at 11. The remaining portions 19 and 23 of the element 18 correspond to the similar portions 9 and 13 of the element 8.

While it would be possible to mold the members 8 or 18 directly into the knob or handle, I prefer to make the handle separately, after which the previously formed spring elements 8 or 18 may be inserted in their recesses and will be maintained therein by the frictional engagement of the arched portion 19 if that type of element is used or the bent portion 11 if that type of element is used. It might be mentioned that while I show the flat type spring and the round type spring in slightly different constructions, obviously both types of material could be employed for either the construction shown in Figure 3 or the construction shown in Figure 6. I prefer to make the spring element from the round wire stock but to provide the inner end with a sharp bend similar to the bend 11 on the element 8. It will be noted that as the portion 13 of the member 8 or the portion 23 of the member 18 is positioned adjacent the recess 2 on the side thereof opposite the flat surface 5, the resiliency of the elements 8 or 18 as the case may be will urge the flat face 4 of the shaft into engagement with the flat surface 5 of the knob. Consequently, as these two rigid flat surfaces are forced into engagement by the spring action of the element, back-lash is substantially eliminated and the handle or knob will seat firmly upon the shaft. It might be mentioned that while I have shown the shaft as flattened, knobs or handles embodying my invention may be used on perfectly round shafts merely by providing a longitudinal slot in the shaft of a size to receive the spring element on the knob. The spring element seating on the bottom of the groove prevents the knob from coming off of the shaft and as it seats in a slot acts as a key to prevent rotation of the parts relative to one another.

Figure 7 discloses still a further modification comprising shaft 24 substantially D-shaped in section, defined by the cylindrical surface part 26 and the flat surface part 28 and which is provided with the transverse slot 30. This shaft is adapted to be received in a recess 32 of a handle 34 and which recess is of substantially the shape and size of the shaft whereby the shaft may be rotated by operation of the handle 34. In this embodiment the shaft 24 is provided with an axially disposed elongated recess 36 adapted to receive a spring element 38 which extends outwardly within the slot 30 and is provided with a bent end part 40 extending laterally of the said slot 30 whereby the same frictionally engages the wall of the recess 32 of the handle when the same is fitted thereover, thereby frictionally securing the parts together. In order to fix the spring element 38 with respect to the shaft 24, the said spring element has its shank bent to provide a lateral offset 42 whereby the said shank has its marginal edge 44 spaced laterally with respect to the marginal edge portions 46 and 48 at a substantially greater distance than the width of the slot 36 whereby the said spring element is frictionally secured with respect of the shaft 24 when inserted into the recess 36. It is of course understood that this spring element 38 may take the form of a spring wire or leaf type spring as hereinbefore described in connection with the embodiments of Figures 1 to 6 inclusive, it being bent as shown to provide the frictional fit and to provide the part 40 extending laterally of the recess 30 whereby the same frictionally engages with the handle to hold the said shaft and handle together, all in accordance with the advantages hereinbefore set forth.

As a still further embodiment, all within the scope of the present invention, the assembly may take the form shown in Figure 8 of the drawings, conforming substantially to the assembly of Figure 7, and accordingly similar reference numerals are used to identify the similar parts. In this embodiment, however, unauthorized or accidental displacement of the spring element 38 is further prevented by staking the shaft 24 as at 52 to provide an abutment or protuberance which engages the shank of the spring element to prevent its longitudinal movement with respect to the recess 36. This staking may be accomplished in any desired manner as by means of a punch or the like applied to the shaft adjacent the recess 36 to press the metal wall defining said recess into engagement with the shank of the spring element. In accordance with this disclosure of the invention, the spring element 38 may be bent as at 54 more abruptly than shown in Figure 7, which bend is particularly adapted to engage with recess 56 provided in the handle 34 adjacent recess 32 to increase the frictional interlocking engagement between the handle and shaft to make it increasingly more difficult to remove the handle from the shaft.

Although Figure 8 discloses the shank of the spring element in frictional engagement with the recess 36 due to the compressed condition of the offset spring material forming the said shank, nevertheless the invention is of such a scope as to comprehend a positive connection between the spring element and the member in which the same is mounted as disclosed without the frictional cooperation due to the compression of the said shank.

The embodiments disclosed in Figures 7 and 8 of the drawings embrace structure all within the scope of the invention, yet varying from the embodiments of Figures 1 to 6 inclusive in respect to the location of the spring element. These forms of the device, as well as the embodiments of Figures 1 to 6 inclusive, provide simplified constructions wherein the parts may be easily and readily fabricated and assembled at low cost, yet providing an arrangement whereby the parts are effectively secured together for operation without relative movement therebetween.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. Motion transmitting means of multi-part construction comprising a non-circular shaft and a handle for receiving said shaft, one of said parts having a recess therein and a second recess adjacent its first-named recess, and a spring element formed with a laterally offset securing shank mounted in said second-named recess, the marginal portions of said shank being spaced apart a substantially greater distance than the width of said second-named recess whereby the same is frictionally mounted therein, said spring element extending into the first-named recess of said one of said parts and extending laterally from said recess for frictionally engaging the other of said parts for holding the same in assembled relation.

2. Motion transmitting means of multi-part construction comprising a non-circular shaft having a diametrically disposed slot in the end thereof and a handle having a non-circular recess for receiving said shaft, said shaft having an axially disposed recess extending inwardly from the base of said slot, and a spring element frictionally mounted in said axially disposed recess, said spring element extending into said slot and radially outwardly from said shaft for frictionally engaging said handle to hold said parts together in assembled relation.

3. Motion transmitting means of multi-part construction comprising a non-circular shaft having a diametrically disposed slot in the end thereof and a handle having a non-circular recess for receiving said shaft, said shaft having an axially disposed recess extending inwardly from the base of said slot, and a spring element formed with a laterally offset securing shank mounted in said axially disposed recess, the marginal portions of said shank being spaced apart a substantially greater distance than the width of said second-named recess whereby the same is frictionally mounted therein, said spring element extending into said slot and radially outwardly from said shaft for frictionally engaging said handle to hold said parts together in assembled relation.

4. Motion transmitting means of multi-part construction comprising a non-circular shaft having a diametrically disposed slot in the end thereof and a handle having a non-circular recess for receiving said shaft, said shaft having an axially disposed recess extending inwardly from the base of said slot, and a spring element mounted in said axially disposed recess and having its free end extending into said slot for transverse movement with respect thereto, said spring element being bowed intermediate its ends and within said slot and disposed radially outwardly from said shaft for frictionally engaging said handle to hold said parts together in assembled relation.

5. In a device of the kind described, the combination of a body portion having a shaft receiving recess therein, and having a separate narrow elongated recess adjacent said shaft receiving recess and communicating therewith, and a spring element positioned in said second-mentioned recess with its free end extending into said shaft receiving recess, the inner portion of said element frictionally engaging the walls of its recess to firmly hold the same therein.

6. In a device of the kind described, the combination of a body portion having a shaft receiving recess therein, a second independent recess extending parallel to said shaft, a shaft engaging element positioned in and smaller in lateral dimensions than said second recess, said element being bent to frictionally engage the side walls of the recess and be retained in the latter thereby.

7. In a device of the kind described, the combination of a body portion having a shaft receiving recess therein and having a narrow elongated recess adjacent to and extending in the same direction as said shaft receiving recess, and an elongated shaft engaging element positioned in said second mentioned recess with its free end extending into said shaft receiving recess, the inner portions of said element being bent to frictionally engage the side walls of the recess and be retained in the latter thereby.

8. Motion transmitting means of multi-part construction comprising a non-circular shaft having a diametrically disposed slot in the end thereof and a handle having a non-circular recess for receiving said shaft, said shaft having an axially disposed recess extending inwardly from the base of said slot, and a spring element formed with a shank adapted to slip into said axially disposed recess, and means for positively securing said spring element in said recess, said spring element extending into said slot and outwardly from said shaft for frictionally engaging said handle to hold said parts together in assembled relation.

HARRY E. LASCH.